United States Patent [19]

Muller

[11] Patent Number: 5,260,032
[45] Date of Patent: * Nov. 9, 1993

[54] INTEGRAL CENTRIFUGE TUBE AND SPECIMEN SLIDE

[75] Inventor: Louis F. Muller, Playa del Rey, Calif.

[73] Assignee: Davstar California, Inc., Newport Beach, Calif.

[*] Notice: The portion of the term of this patent subsequent to Jul. 9, 2008 has been disclaimed.

[21] Appl. No.: 815,133

[22] Filed: Dec. 27, 1991

[51] Int. Cl.$^5$ ............................................. B01L 3/00
[52] U.S. Cl. ............................ 422/102; 422/58;
422/72; 436/45; 436/46; 436/165; 436/177;
436/810; 435/296; 494/16; 359/894; 356/244;
356/246; 356/440
[58] Field of Search ............ 422/58, 61, 72, 102;
436/45, 46, 165, 177, 180, 808, 810; 435/296,
310; 494/16; 356/246, 244, 440, 427; 359/894

[56] References Cited

U.S. PATENT DOCUMENTS

| | | |
|---|---|---|
| 3,814,522 | 6/1974 | Clark et al. .................. 422/102 X |
| 4,066,414 | 1/1978 | Selby .............................. 422/102 |
| 4,105,415 | 8/1978 | Lovett ............................. 422/58 |
| 4,427,634 | 1/1984 | Truglio ............................ 422/99 |
| 4,528,187 | 7/1985 | Truglio ......................... 422/99 X |
| 4,624,835 | 11/1986 | Davis et al. .................. 422/102 |
| 4,786,594 | 11/1988 | Khanna et al. ............... 435/6 X |
| 4,865,812 | 9/1989 | Kuntz et al. ................... 422/99 |
| 4,981,654 | 1/1991 | Kuntz et al. ................. 422/102 |
| 5,030,421 | 7/1991 | Muller ........................ 435/296 X |

Primary Examiner—James C. Housel
Assistant Examiner—Maureen M. Wallenhorst
Attorney, Agent, or Firm—Henry M. Bissell

[57] ABSTRACT

A device for use in a centrifuge to automatically prepare microscope slide specimens from samples of body fluids. A centrifuge tube and specimen slide are formed integrally in a unitary device. A lens clearance section is provided as a planar surface to avoid interference between the device and the rotatable lenses of a turret microscope while the device is in viewing position on the microscope stage. The device is constructed to minimize packing of sediment and other constituent elements of the sample at the entrance to the slide member and is so configured as to admit of a step during the centrifuge process which flexes the slide member to enhance the distribution of cells deposited therein.

22 Claims, 2 Drawing Sheets

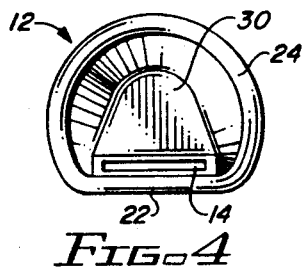
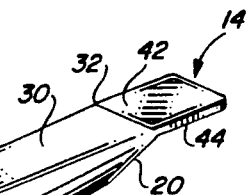
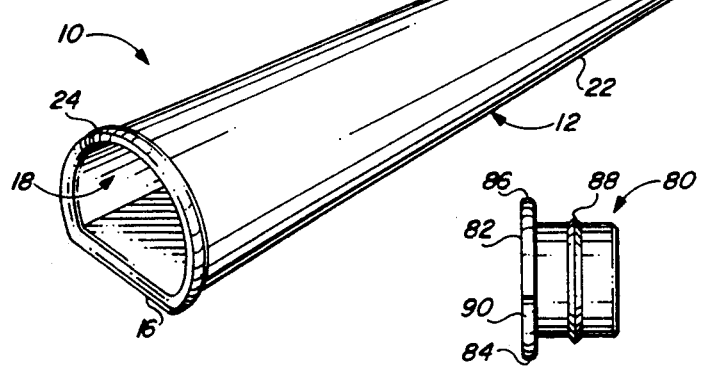
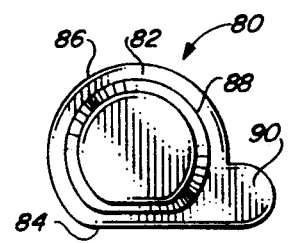
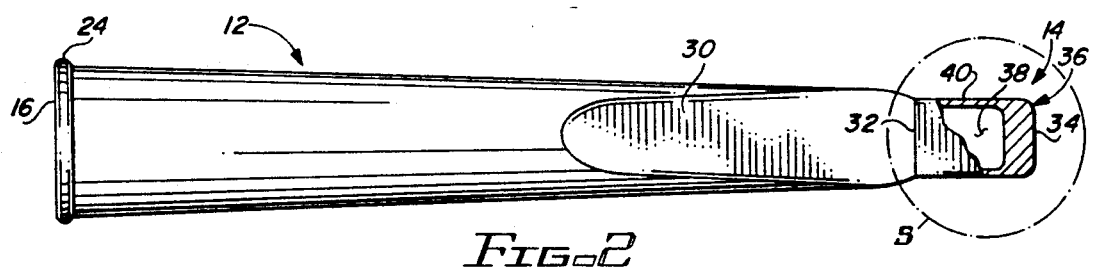
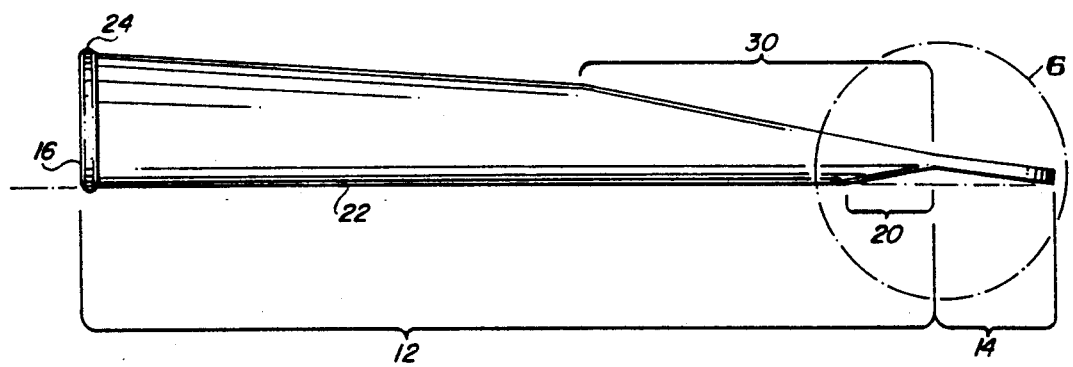

INTEGRAL CENTRIFUGE TUBE AND SPECIMEN SLIDE

BACKGROUND OF THE INVENTION

1. Field of the Invention

The present invention generally relates to laboratory equipment and, more particularly, to an integral biological specimen collection tube and microscope slide constructed as a unitary device.

2. Description of the Related Art

Various types of laboratory devices have been devised in the past for the collection and handling of biological specimens. Certain ones of these devices are used particularly in laboratory centrifuges and the like. Complete urinalysis typically involves centrifugation of the specimen to isolate any sediment for microscopic study. Most procedures and devices currently in use require pouring the test liquid into a centrifuge tube and separately decanting the supernatant liquid from the sediment after centrifugation, then transferring the sediment to a microscope slide. Such procedures are time-consuming and expensive. Moreover, these individual steps are multiple in character, take the time of the technician, and increase the technician's contact with the specimen, thus increasing the risk of contracting disease from a specimen.

An improved combination collector tube and microscope slide member is described in U.S. Pat. No. 4,066,414. The tube and slide member are connected by a narrow, weak, frangible neck which is intended to be snapped through to remove the collection tube when the slide member is to be used. However, manufacturing and handling difficulties may occur with such a device. Moreover, the small delicate slide member must be separately handled after detachment, usually by mounting it in a secondary carrier, in order to place it into viewing position.

There remains a need for an improved type of device which can be used for initial biological liquid collection, subsequent centrifugation, sediment isolation and microscopic examination, all without transferring the test materials to other laboratory equipment. While the specimen tube of U.S. Pat. No. 3,814,522 would appear to present these features, it has been found that there are still serious drawbacks in that device. For example, the terminal chamber of the device, which is intended for microscope viewing, is aligned substantially with the central axis of the enlarged upper body portion (the centrifuge tube proper). This locates the slide portion substantially above the microscope stage, when in use, and undesirably affects the microscope optics. Moreover, it is impossible to view the slide portion of this device at different powers of microscope magnification without shifting the device out of the way while the microscope lens turret is rotated and then repositioning the device for viewing at the newly set level of magnification. This procedure is unduly time consuming and requires an added level of skill in the viewer to achieve proper results.

Another device for enabling a specimen to be viewed through a microscope after centrifuging is disclosed in U.S. Pat. No. 4,865,812. While this device is an improvement relative to the devices disclosed in the patents cited hereinabove, it still presents the limitation that its slide portion cannot be viewed at different powers of microscope magnification without shifting the device out of the way while the microscope lens turret is rotated.

My prior U.S. Pat. No. 5,030,421 discloses a device incorporating a longitudinally curved, concave section of the centrifuge tube portion of the device to provide microscope lens clearance. My present invention relates to other configurations for this purpose combined with additional beneficial features to achieve an improved integral centrifuge tube and specimen slide.

SUMMARY OF THE INVENTION

In brief, arrangements in accordance with the present invention comprise an integrally formed combination of a centrifuge tube member and enclosed microscope slide member joined together in a single device having a communication passage between the tube member and the slide member. The tube member comprises a hollow, generally tubular container which serves as a specimen collection member, having a central specimen collection space therein communicating with an open end of the container. The slide member has transparent flat front and rear walls with joining side walls extending throughout at least part thereof and defining a central specimen cavity communicating with the container space through the end of the container remote from the open end. Adjacent the juncture between the tube member portion and the slide member portion is a transition section in which the cross-section of the tubular container reduces and transitions to match the cross-section of the slide member portion.

The container also serves as a permanent rigid handle for the microscope slide member. In one embodiment, the tubular container portion of the device has a flattened side presenting a planar surface extending completely along the tubular container portion from the transition section to the open end of the container. A narrow lip projecting outward and extending about the open end of the tubular container is removed at the juncture with the planar surface. For convenience in orientation, the planar surface of the flattened side will be regarded as extending along the rearward side of the tubular container portion. In another embodiment, the planar surface extending along the rearward side of the tubular container portion continues to extend along the rearward or under side of the slide member portion, thus maintaining the under side of the slide member and the rearward side of the tubular member as a single continuous planar surface.

In accordance with an aspect of the invention, this transition section is particularly configured to obviate a problem which has been encountered in the use of some of the known prior devices developed for specimen collection. Some of these devices have been found in use to develop a packing of sediment or other constituent elements in the vicinity of the juncture between the tube member and the microscope slide. Buildup at this point interferes with the passage of cells into the slide member to develop a correctly analyzable sample in the slide portion. For example, urine crystals in a urine sample have exhibited a tendency to pack at the mouth of the slide member portion in certain known devices, resulting in the degradation of the accuracy of the results achieved from analyzing slide specimens taken in such a device. For best results in ease and accuracy of analysis of a slide specimen, it is desirable that the specimen be formed as a mono-cellular layer, or at least such a layer on the upper and lower surfaces of the view section. This calls for a slide member having an extremely thin space between the upper and lower walls of the slide chamber.

To alleviate the problem of sediment packing at the entrance to the extremely thin slide chamber, the transition section of the present invention is shaped to define a tapered entrance space between top and bottom walls converging at a selected small angle, less than 20 degrees, and preferably in the vicinity of 15 degrees. This transition region extends for a distance at the terminal end of the tube member which is in excess of 50% of the length of the slide chamber. In this region, the upper and lower walls of the tube member converge toward each other, the lower wall extending upwardly from the rearward planar section at a slight angle, less than 10 degrees, preferably approximately 8 degrees, while the upper wall of the tube member slants downwardly at approximately 12 degrees relative to the planar rearward surface. In this transition section, the thickness of the tube walls reduces materially, in excess of 20% and preferably approximately 25-35%. This reduction in thickness of the upper and lower walls in the transition section occurs throughout the section and results in a further reduction of the entrance angle leading into the slide chamber. The reduction in thickness in the side walls begins at about midway through the transition section. As a result, the upper and lower walls of the viewing section in the slide member are extremely thin, on the order of 0.013 inches. This enhances the clarity of the specimen as viewed through a microscope. The side walls reduce in thickness to about 0.015-0.020 inches combining with the thin upper and lower walls to develop a flexibility of the slide member which renders the slide member readily bendable, relative to the tube member.

Arrangements in accordance with the present invention incorporate a configuration which provides a clearance for the different lenses which are mounted on the rotatable turret of a multi-lens microscope. This clearance is provided along the front or upper side of the combination tube and slide member, situated in the tube portion extending away from the juncture with the slide member. This enables the user to rotate the lens turret from one lens position to another while the combination device is in place on the microscope stage without having to move the device out of the way.

In one embodiment of the invention, the device is formed with a planar surface extending along the front side of the tube portion from the juncture with the slide member to a point approximately midway along the tube member portion. Thus, the lens turret of a microscope may be rotated while the device of the present invention is in place for viewing of the specimen in the slide member portion without encountering any interference or obstruction from the integral tubular container portion.

In this first embodiment of the invention, the slide member portion extends from the juncture with the tubular member portion at a slight downward angle, relative to the longitudinal axis of the tubular member. This results in the terminal end of the slide member portion being on or slightly above the extension plane of the rearward planar surface so that it is close to touching the microscope stage when the device is in position thereon. The slide member portion is sufficiently thin and flexible that it may be deflected by flicking momentarily and repeatedly at particular points in the centrifuge process to improve the distribution of cells within the viewing area of the slide member. The slide member terminates in a tab element which is provided for this purpose.

In a second embodiment of the invention, the desirable lens clearance is provided by forming the tubular member with a stepped portion in a region adjacent the slide member. This stepped portion is formed by flattening the tube member for a distance of approximately 1 to 1.5 inches from the juncture with the slide member to a thickness of approximately one-half its normal diameter.

BRIEF DESCRIPTION OF THE DRAWINGS

A better understanding of the present invention may be realized from a consideration of the following detailed description, taken in conjunction with the accompanying drawing in which:

FIG. 1 is a schematic perspective view of one particular arrangement in accordance with the present invention;

FIG. 2 is a schematic top plan view, partially broken away, of the arrangement of FIG. 1;

FIG. 3 is a schematic side elevational view of the arrangement of FIG. 1;

FIG. 4 is a schematic end view of the arrangement of FIG. 1, taken from the open end of the tubular member;

FIG. 7 is a side view of a plug closure for the arrangements of FIGS. 1 and 9;

FIG. 8 is an end view of the closure of FIG. 7;

DESCRIPTION OF THE PREFERRED EMBODIMENTS

Figure 5:
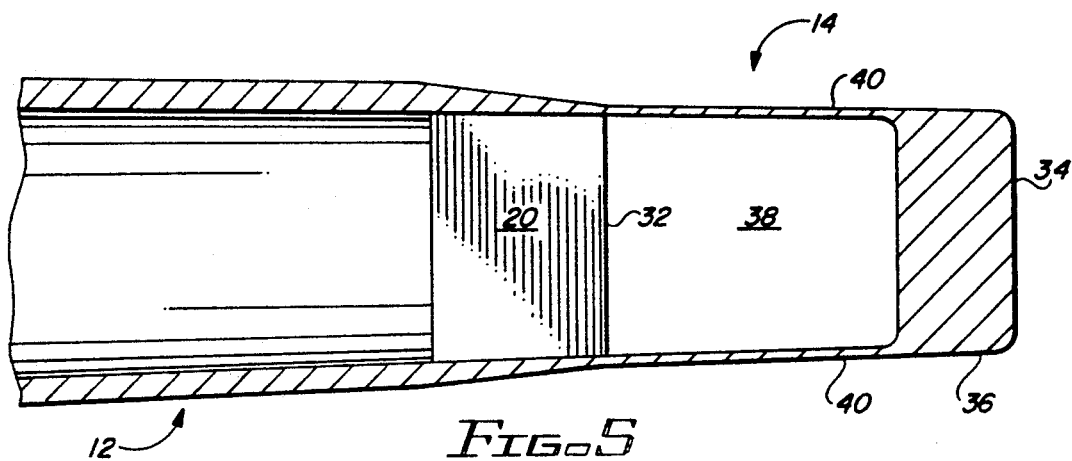
FIG. 5 is an enlarged view, in section, of the portion within the circle in FIG. 2.

In the first preferred embodiment of the integral centrifuge tube and specimen slide device 10 of the present invention as shown in FIGS. 1-4, the device 10 comprises a tubular member or portion 12 integrally formed with a covered slide member or portion 14. The tubular member has a proximal end 16 remote from the slide member 14 with an opening 18 for admitting a liquid specimen which is to be centrifuged so that sediment, cells, and other constituent elements may be concentrated and collected in the slide member 14 for inspection. The tube member tapers at a conical angle of about two degrees. The distal end of the tube portion 12 contains a transition portion 20 in which the cross-sectional shape of the tube member 12 transitions to match the cross-section of the slide member 14. The rearward side of the tube member 12, short of its juncture with the transition portion 20, is a flat planar surface 22 so formed to provide a side on which the device may rest for inspection under a microscope. The opening 18 is surrounded with a lip 24 except along the bottom flat side 22.

Along the upper side of the device 10 is a planar surface 30 which extends from a juncture line 32 between the tube and slide members 12, 14, along the front or upper side of the tube member 12 for approximately 40% of its length. This planar surface 30 defines a clearance section which provides clearance for the lenses of a turret microscope to be rotated from one level of magnification to another as the specimen within the slide member 14 is in viewing position on the microscope stage so that the device 10 does not have to be temporarily removed and repositioned as the level of magnification is shifted.

The slide member portion 14 is approximately 9/16 inches long, extending from the junction line 32 to its tip end 34 and approximately 5/16 inches wide, tapering slightly along its length. The termination adjacent the tip 34 is a solid section or tab 36, leaving a viewing area 38 which is approximately 7/16 inches long and sightly less than 5/16 inches wide. The upper and lower walls of the viewing section 38 are extremely thin, being on the order of approximately 0.010 to 0.014 inches in thickness, preferably 0.012 inches, and the space between the upper and lower faces of the viewing section 38 is approximately 0.010 to 0.012 inches, preferably 0.011 inches; thus providing an overall thickness of 0.035 inches +/− 0.002 inches. The side walls of viewing section 38 are 0.010 to 0.014 inches thick, preferably 0.012 inches. Ideally, the specimen deposited within the viewing area of the slide member 14 will be a mono-cellular layer of the substance being analyzed.

Figure 6:
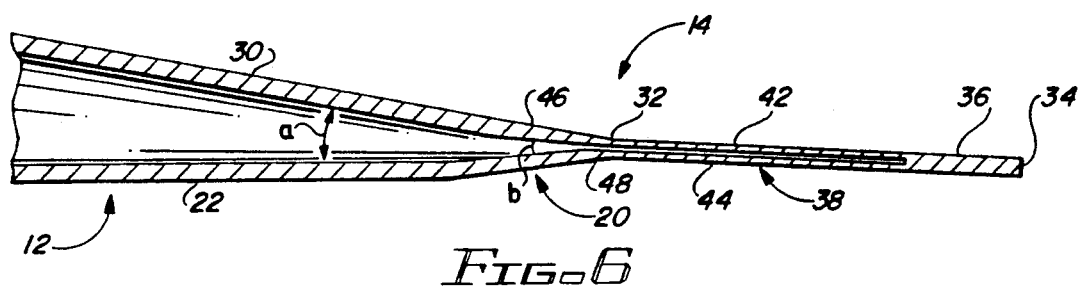
FIG. 6 is an enlarged view, in section, of the portion within the circle in FIG. 3.

As better shown in the enlarged drawings of FIGS. 5 and 6, a transition portion 20 provides for a decrease in the entrance angle in the region ahead of the juncture line 32 where the sediment, cells and other constituent elements enter the viewing section 38 of the slide member portion 14. Upstream of the transition portion 20, the planar surface 30 of the upper side of the tube member 12 converges on the rearward planar surface 22 at a small angle a which may be in the range of 5 to 10 degrees, preferably 8 degrees. In the transition section 20, this angle is actually increased slightly by virtue of the thinning of the walls 46, 48 and the upper incline of the rear wall 48 of the transition section 20. This results in an entrance angle b in this region just preceding the junction line 32 at the entrance of the viewing section 38 in the range of 8 to 12 degrees, preferably about 10.5 degrees, as the walls 46, 48 diminish in thickness from approximately 0.050–0.055 inches to approximately 0.012 inches at the thickness of the top and bottom walls 42 and 44 of the slide member 14. As a consequence of this construction with the very thin walls in the viewing section 38 of the slide member 14, the slide member 14 is quite flexible in the vertical direction (transverse to the rear planar surface). Red blood cells are approximately 7 microns in diameter, white cells approximately 20 microns, and urine crystals may be approximately 300 microns in diameter. In certain urinary samples which may be relatively very thick because of certain mucous and heavy element content with considerable debris therein, one common approach in the standard method of urinalysis, where a drop of the centrifuged concentrate is deposited on a microscope slide and covered with a slide cover, is to dilute the specimen, conduct the count, and thereafter multiply the count by the dilution factor. Because of the improved effectiveness of the combination centrifuge tube and slide member of the present invention, this step of dilution and compensation generally becomes unnecessary, particularly where the device is repeatedly tapped by applying a flicking force to the tab 36 during deceleration in the centrifuge. This step achieves a more even distribution of cells over the viewing area 38, and the closeness of the upper and lower walls 42, 44 develops a certain surface attraction which aids in achieving this more even distribution.

As best seen in FIG. 3, the slide member 14 is displaced from the plane of the flat rear surface 22, shown extended by the broken lines at either end of the figure. This protects the under side of the slide member 14 from being scratched as it is being moved about the microscope stage to place it in the proper position for viewing.

A plug or cap 80 for closing the open end of the devices of FIGS. 1–4 and 9–10 is shown in FIGS. 7 and 8. The plug 80 has a partially round outer wall 82 with a flat section 84 to match the flat side 22 of FIG. 1 (56 of FIG. 9). This is surrounded by a lip 86 at its outer end and a small ridge 88 approximately midway along its length provided to achieve an enhanced sealing effect when the plug is inserted in the device 10 or 50. A tab 90 along one side projects from the lip 86 to facilitate removal of the plug from the device 10 or 50. The plug or cap 80 may be thermoformed of an inexpensive plastic material and is hollow to provide the desired wall flexibility with lightweight and low cost.

Figure 9:
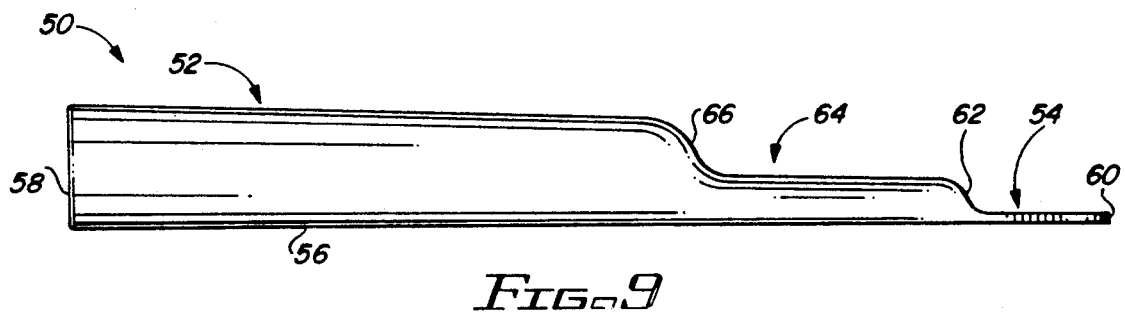
FIG. 9 is a schematic side elevational view of another particular arrangement in accordance with the present invention.
Figure 10:
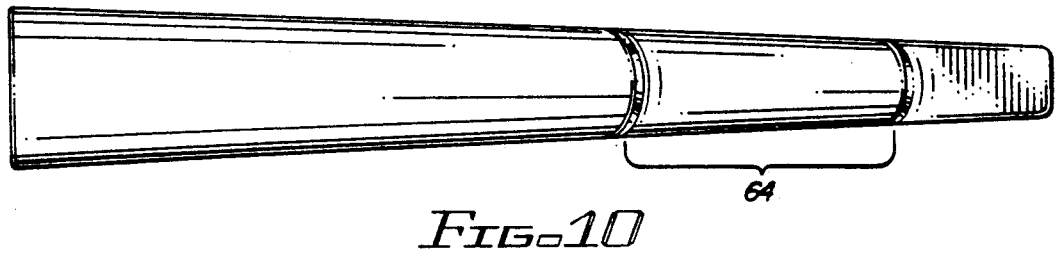
FIG. 10 is a schematic top plan view of the arrangement of FIG. 9.

Another embodiment of the present invention is depicted in FIGS. 9 and 10. In these figures, a combination centrifuge tube and slide member 50 is shown comprising a tube member 52 formed with an adjacent slide member portion 54 at the right-hand end thereof. The rear wall 56 of the device 50 is flattened to provide a planar surface which extends from the open end 58 of the tube 52 to the terminal end 60 of the slide member 54. A transition section 62 is provided adjacent the juncture between the tube member 52 and the slide member 54 to accommodate the transition in cross-section from the tube member 52 to the slide member 54. Adjacent the transition section 62, along the upper surface of the tube member 52, is a flattened region 64 which in profile (see FIG. 5) curves inwardly in the region 66 from the full diameter of the tube member 52 and continues to the transition section 62. This is a generally planar section 64, parallel to the rear planar surface 56, which provides the desired clearance for rotation of the lenses of a turret lens microscope while the device 50 is maintained in viewing position on the microscope stage. The slide member 54 of the device 50 is constructed with approximately the same dimensions of viewing area and wall thickness as are provided for the device of FIGS. 1–4.

In preparation for use of devices embodying the present invention, a specimen is deposited in known fashion within the device 10 or 50, and the plug 80 is inserted into the open end 18. The device such as 10 with specimen therein is then placed in a centrifuge which automatically prepares the specimen within the microscope slide member 14, 54 in the manner described hereinabove.

Devices in accordance with the present invention advantageously provide a transport system for the automatic preparation of a microscope slide specimen. The tube member and the slide member are integrally formed as a unitary device. This provides major advantages in product fabrication and in the ultimate use of the product. Because the product is molded as a single part, fabrication is simplified and costs of materials and labor are reduced. In use, the device admits of the automatic preparation of a microscope slide specimen from the sample in a centrifuge tube, and the resulting slide member is provided with a convenient extension (the tube member) which serves as a handle during transport and manipulation on a microscope stage. Devices in accordance with the invention are shaped so that a microscope lens turret may be rotated from one level of magnification to another while the device is in place for specimen viewing on the microscope stand without interference between the device bearing the specimen slide member and the microscope lenses. The structure and configuration of these devices are such that improved slide specimens are developed so that more accurate results can be achieved in the analysis of the slide specimen.

Although there have been described hereinabove various specific arrangements of an integral centrifuge tube and specimen slide in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An integral centrifuge tube and specimen slide comprising:
   a tubular member portion and a hollow slide member portion integrally joined together at a transverse juncture line with a transition region between the two portions in which the tubular member portion reduces in size and changes shape to merge with the slide member portion;
   the tubular member portion having a proximal end with an opening therein for the admission of fluid samples, a distal end at said juncture line, and a generally cylindrical side wall with front and rearward sides having a predetermined thickness and tapering slightly from said proximal end at a predetermined conical angle;
   the hollow slide member portion having opposed upper and lower walls and a pair of side walls all having predetermined thicknesses;
   said tubular member portion further having a first planar surface extending along the rearward side thereof and having a predetermined thickness, and a second planar surface extending along the front side of the tubular member portion from the juncture line to a point near the midpoint of the tubular member portion and intersecting the tubular member portion along a curved line of intersection, said second planar surface being joined with the cylindrical side wall of the tubular member portion along the line of intersection therewith, said second planar surface having a wall thickness approximately equal to the predetermined side wall thickness of said tubular member portion except in said transition region where the wall thickness of said second planar surface diminishes to a thickness equal to said predetermined thickness of the upper wall of the slide member portion.

2. The device of claim 1 wherein said tubular member portion further includes a third planar surface defining the under side of said transition region, said third planar surface extending from said first planar surface and diminishing in wall thickness from the predetermined thickness of said first planar surface to a thickness matching the predetermined thickness of the lower wall of said slide member portion.

3. The device of claim 2 wherein said slide member portion includes a hollow viewing chamber for receiving a specimen, said chamber being formed by said upper wall, said lower wall and said pair of side walls of said slide member portion, wherein the walls surrounding said chamber are sufficiently thin to permit the slide member portion to be readily flexed in the region of the viewing chamber.

4. The device of claim 3 wherein the slide member portion includes a terminal end tab element extending beyond the walls of the viewing chamber and forming a terminal end to said chamber remote from said tubular member portion to receive the application of external forces for flexing the viewing chamber to improve the even distribution of material within the viewing chamber.

5. The device of claim 3 wherein the upper and lower walls of the viewing chamber are approximately 0.010 to 0.014 inches thick.

6. The device of claim 5 wherein the upper and lower walls of the viewing chamber are spaced apart by a distance of approximately 0.010 to 0.012 inches.

7. The device of claim 6 wherein the overall thickness of the slide member portion is approximately 0.035 inches.

8. The device of claim 3 wherein the first planar surface and the second planar surface converge in the direction of the juncture line at a first selected angle, and wherein the second planar surface and the third planar surface converge in the direction of the juncture line at a second selected angle which is greater than said first selected angle in order to minimize the packing of constituent materials in a fluid sample outside of the viewing chamber in said slide member portion.

9. The device of claim 3 wherein said second and third planar surfaces form upper and lower walls of said transition region adjacent the distal end of the tubular member portion which diminish in thickness from the predetermined thickness of the cylindrical side wall of the tubular member portion to the predetermined thickness of the upper and lower walls of the slide member portion.

10. The device of claim 9 wherein said transition region further includes side walls which diminish in thickness from the predetermined thickness of the cylindrical side wall of the tubular member portion to the predetermined thickness of said pair of side walls of the slide member portion viewing chamber to render said slide member portion readily flexible in a direction generally transverse to said first, second and third planar surfaces.

11. The device of claim 10 wherein said upper and lower walls of said transition region diminish from a wall thickness of approximately 0.050 to 0.055 inches to a thickness of approximately 0.012 inches at the entrance of said slide member portion.

12. The device of claim 11 wherein the side walls of the transition region diminish from a thickness of approximately 0.050 to 0.055 inches to a thickness of approximately 0.012 inches at the entrance of the slide member portion, beginning approximately midway in said transition section.

13. The device of claim 1 wherein said tubular member portion includes a lip extending about the opening at the proximal end, except along said first planar surface.

14. The device of claim 1 further including a plug shaped to fit within the opening at the proximal end of the tubular member portion, said plug being closed at one end and open at the other end to define a hollow space within the plug, said plug having at least one outwardly protruding peripheral ridge spaced from the closed end for effectively sealing said opening.

15. The device of claim 14 wherein said plug further includes a laterally extending tab adjacent the closed end to facilitate removal of the plug from the opening at the proximal end of the tubular member portion.

16. In an integral specimen collection tube and microscope slide device which comprises in combination:
   a tube member portion having means defining an entrance opening at a proximal end and an exit opening at a distal end, said tube member portion having a generally cylindrical side wall of a predetermined thickness with a first flat planar surface extending along a rear side thereof;
   a slide member potion joined to the tube member portion at said distal end and extending longitudinally beyond the tube member portion to a closed terminal end of the device, the slide member portion comprising flat, optically transparent, opposed parallel upper and lower walls and side walls of a predetermined thickness defining a chamber for receiving and displaying a specimen for viewing through a microscope having a slide supporting stage; and
   a lens clearance section comprising means defining a reduced cross-section of the tube member portion which extends from the slide member portion to a point on the cylindrical side wall of the tube member portion remote from the slide member portion; the improvement comprising:
      a second flat planar surface extending from a juncture line between the tube member portion and the slide member portion along the upper wall of said slide member portion and converging at a first selected convergence angle with the rear side first flat planar surface, said second planar surface having a wall thickness through a major portion thereof which is generally equal to the predetermined thickness of the cylindrical side wall of the tube member portion, said second planar surface wall thickness diminishing in a region adjacent said juncture line to match the thickness of the upper wall of the slide member portion.

17. The combination of claim 16 further comprising a transition portion having a lower wall section formed as a third flat planar surface joined to the distal end of said rear side first flat planar surface and extending at a second selected convergence angle thereto to connect with the lower wall of said slide member portion adjacent said juncture line, the lower wall section of said transition portion having a tapered wall diminishing in thickness from the thickness of the rear side first flat planar surface to match the thickness of the lower wall of the slide member portion.

18. The combination of claim 17 wherein said second flat planar surface and said lower wall section in said transition portion have inner surfaces converging at a third selected convergence angle greater than the first selected convergence angle to define an entrance region for fluid specimen constituent elements entering the specimen receiving chamber of said slide member portion.

19. The combination of claim 16 wherein the upper and lower walls and the side walls of said slide member portion are sufficiently thin as to render the specimen receiving chamber of the slide member portion flexible to permit flexing of the slide member portion relative to the tube member portion.

20. The combination of claim 19 wherein the walls of the slide member portion are joined together and extend beyond the closed terminal end of the device so as to form a solid tab element at the distal end of said slide member portion for effecting the flexing of the slide member portion to more evenly distribute specimen constituent elements in the slide member portion.

21. The device of claim 5 wherein the thickness of the upper and lower walls of the viewing chamber is 0.012 inches thick.

22. The device of claim 6 wherein the distance between the upper and lower walls of the viewing chamber is 0.011 inches.

* * * * *